US006957078B1

(12) United States Patent
Yousefi et al.

(10) Patent No.: US 6,957,078 B1
(45) Date of Patent: Oct. 18, 2005

(54) GATED POWER FOR A SATELLITE HOPPED DOWNLINK WITH MULTIPLE PAYLOADS PER FRAME

(75) Inventors: Esmaell Yousefi, Manhattan Beach, CA (US); Stuart T. Linsky, San Pedro, CA (US); Mark E. Bever, Redondo Beach, CA (US); Fred C. Tramm, Rancho Palos Verdes, CA (US); Lisa A. Moy-Yee, Torrance, CA (US); Vincent Nguyen, Garden Grove, CA (US); Gefferie H. Yee-Madera, San Gabriel, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 867 days.

(21) Appl. No.: 09/599,042

(22) Filed: Jun. 21, 2000

(51) Int. Cl.[7] .................................................. H04B 7/00
(52) U.S. Cl. ...................... 455/522; 455/427; 455/12.1
(58) Field of Search .............................. 455/427, 12.1, 455/13.1, 13.4, 522; 370/252, 329

(56) References Cited

U.S. PATENT DOCUMENTS

| 4,685,149 | A | * | 8/1987 | Smith et al. ................. 455/524 |
| 5,638,399 | A | * | 6/1997 | Schuchman et al. ......... 370/324 |
| 6,072,788 | A | | 6/2000 | Peterson et al. |
| 6,333,922 | B1 | * | 12/2001 | Campanella ................. 370/319 |
| 6,366,776 | B1 | * | 4/2002 | Wright et al. ................. 455/427 |
| 6,545,989 | B1 | * | 4/2003 | Butler .......................... 370/329 |
| 6,577,524 | B2 | * | 6/2003 | Brooks et al. ................. 365/78 |
| 6,690,741 | B1 | * | 2/2004 | Larrick et al. ............... 375/295 |
| 2002/0064135 | A1 | * | 5/2002 | Chen et al. ................... 370/252 |
| 2003/0086383 | A1 | * | 5/2003 | Bremer et al. ............... 370/311 |
| 2003/0086515 | A1 | * | 5/2003 | Trans et al. .................. 375/346 |

FOREIGN PATENT DOCUMENTS

| EP | 0416462 | 3/1991 |
| EP | 0805568 | 11/1997 |
| GB | 2336508 | 10/1999 |

* cited by examiner

*Primary Examiner*—Nick Corsaro
*Assistant Examiner*—Tan Trinh

(57) ABSTRACT

A power gating module (200) for a downlink beam frame signal (402) includes a power amplifier (210) for amplifying for transmission frame signals that include at least a first header signal (418), a first payload signal (420), a second header signal (424), and a second payload signal (426). The power gating module (200) further includes a power gating circuit (300) coupled to the power amplifier (210). The power gating circuit (300) includes a power gate input (318) and is responsive to a power gating signal to remove power from at least one of the first header signal (418) and first payload signal (420) in combination, and the second header signal (424) and second payload signal (426) in combination before amplification by the power amplifier (210).

8 Claims, 4 Drawing Sheets

GATED POWER FOR A SATELLITE HOPPED DOWNLINK WITH MULTIPLE PAYLOADS PER FRAME

CROSS-REFERENCE TO RELATED APPLICATIONS

This application is related to Ser. No. 09/270,361, titled "Gated Power Time Division Downlink for a Processing Satellite", filed Mar. 16, 1999.

BACKGROUND OF THE INVENTION

The present invention relates to satellite communications systems. In particular the present invention relates to downlink beam power gating techniques particularly adapted to beam hopped multiple payload frame structures.

Satellites have long been used to provide communications capabilities on a global scale. Since the inception of the modern communications satellite, however, one factor has remained constant: the limited availability of power on board the satellite. The limited availability of power persists today even in the face of tremendous advances in satellite technology.

Major drains on satellite power include the communications reception equipment used to receive the uplink and the transmission equipment used to generate the downlink. The transmission equipment in particular often requires 50% or more of the total power generated by a satellite. Furthermore, downlink power amplifiers are far from 100% efficient and therefore waste power whenever they are active.

Any undue drain on satellite power is undesirable. Thus, for instance, limitations on satellite power may prevent a satellite from encoding and decoding heavier and more error protective coding techniques. As another example, limited satellite power may reduce the number and type of observational or sensing functions which a satellite may perform.

In addition, as satellite technology has progressed, it has become more common for satellites to process their uplinks. In other words, the satellite may decode, process, route, queue, and otherwise manipulate data before recoding and packaging the data into downlink frames. Thus, the utilization of the downlink depends on the amount of data ready and waiting to be transmitted. Transmitting partially empty frames can be a waste of power, and can have detrimental impacts on the satellite performance through unnecessary servicing of queues, for example.

A need has long existed in the industry for a gated power time division downlink that addresses the problems noted above and others previously experienced.

BRIEF SUMMARY OF THE INVENTION

A preferred embodiment of the present invention provides a method for power gating a downlink beam frame signal. The method includes the steps of transmitting, to form a single multiple payload frame, at least a first header signal, a first payload signal, a second header signal, and a second payload signal. When power gating is active, the method removes power from at least one of the first header signal and first payload signal in combination, and the second header signal and second payload signal in combination. The method for power gating may be extended to an N header N payload frame.

As an example, the method may also hop the downlink beam frame signal between at least two terrestrial cells. Then, power gating may be activated based in part on the terrestrial cell to which the downlink beam frame signal is currently hopped. In certain embodiments, the decision to power gate may be also based on a statistical multiplexing estimate of downlink frame utilization. As one example, when the downlink is expected to be 90% fully utilized, then power gating may occur for up to 10% of all frames. Power gating may also be performed in order to maintain at least one data queue approximately at preselected occupancy level on average, or when too few cells are available to fill a frame or payload.

Another preferred embodiment of the present invention provides a power gating module for a downlink beam frame signal. The power gating module includes a power amplifier for amplifying, for transmission, frame signals that include at least a first header signal, a first payload signal, a second header signal, and a second payload signal. The power gating module further includes a power gating circuit coupled to the power amplifier. The power gating circuit includes a power gate input and is responsive to a power gating signal to remove power from at least one of the first header signal and first payload signal in combination, and the second header signal and second payload signal in combination before amplification by the power amplifier.

DETAILED DESCRIPTION OF THE INVENTION

Figure 1:
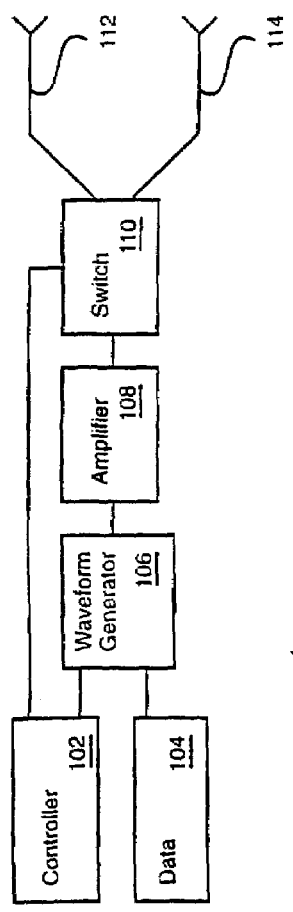
FIG. 1 illustrates a block diagram of a power gating module.

Turning now to FIG. 1, that figure shows a block diagram of a power gating module 100 that also functions, in general, to generate downlink frame waveforms. The power gating module 100 includes a controller 102 and a waveform processing chain that operates on data provided by the data source 104 (which may be a data memory divided organized by data queues, for example). In particular, the waveform processing chain includes a waveform generator 106, a power amplifier 108, and a switch 110. The waveform processing chain further includes a first feed path 112 and a second feed path 114.

The first feed path 112 and the second feed path 114 may, for example, connect to individual antenna feed horns to direct spot beam coverage to distinct terrestrial cells. The feed paths 112–114 may also be characterized by a polarization effect on the waveform that propagates along the feed paths 112–114, including clockwise or counter-clockwise polarization.

The waveform generator 106 accepts baseband data from the data source 104 and creates a waveform to be transmitted (after amplification by the power amplifier 108). The switch 110 selects the particular feed path 112–114 along which the waveform propagates (and thus, in certain embodiments, the polarization and/or hop location associated with the waveform).

The controller 102 exercises beam hopping and power gating control over the waveform to be transmitted. Thus, the controller 102 may output a power gating signal that is active when selected downlink frame signals are to be power gated. More particularly, as explained below, the controller 102 may power gate one or more header signals, payload signals, and flush signals based in part on the current hop location for a downlink beam and other criteria.

Figure 2:
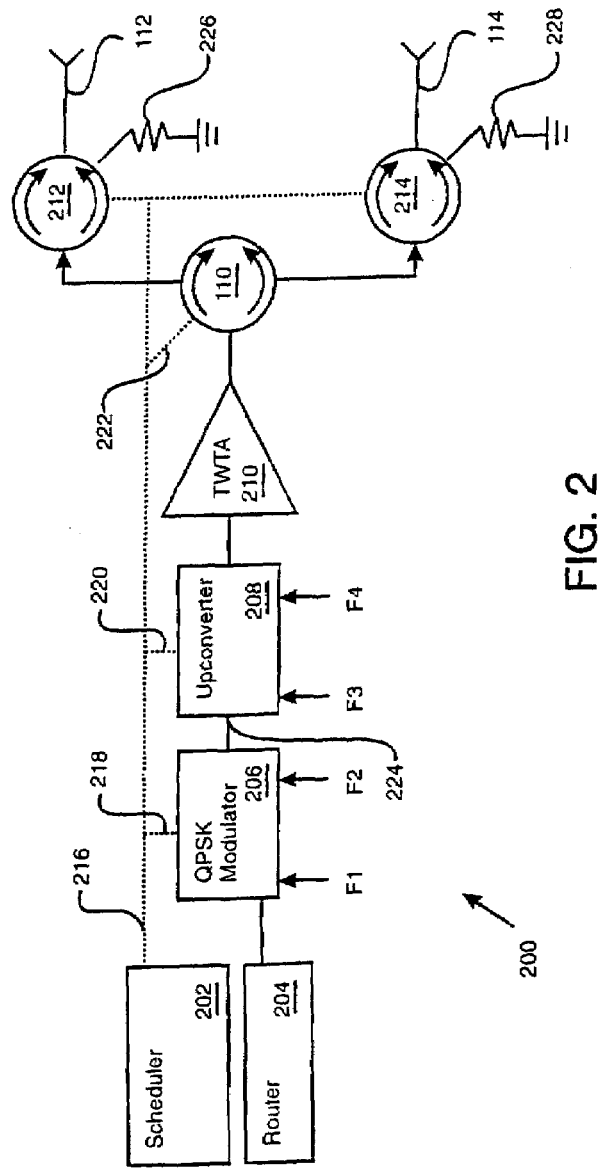
FIG. 2 shows a detailed block diagram of a power gating module.

With regard to FIG. 2, a more specific implementation of a power gating module 200 is shown. The power gating module 200 includes a data scheduler 202, a data router 204, and a waveform processing chain including a QPSK modulator 206, an upconverter 208, and a traveling wave tube amplifier (TWTA) 210. The switch 110 is illustrated in FIG. 2 as a ferrite switch 110 that directs the waveform to be transmitted through either the first feed path 112 or the second feed path 114.

FIG. 2 also shows a control output 216 (that may used to carry, as examples, a power gating signal and a beam hopping selection signal), two frequency selection inputs 218 and 220 for the modulator 206 and the upconverter 208, a feed path selection input 222, and an intermediate waveform output 224 from the modulator. Preferably, additional ferrite switches 212 and 214 in the feed paths 112, 114 provide additional signal isolation (e.g., approximately 20 db between input and output when the ferrite switch is off). In other words, the additional ferrite switches 212, 214 operate in response to the control output 216 to pass or block a waveform to be transmitted through the feed paths 112, 114. In other words, when the waveform to be transmitted is destined for the feed 112, then the ferrite switch 214 is coupled through the load 228 to ground. Similarly, when the waveform to be transmitted is destined for the feed 114, then the ferrite switch 212 is coupled through the load 226 to ground.

During operation, the power gating module 200 accepts baseband data from the router 204 (e.g., an ATM cell router), and creates a waveform to be transmitted using the waveform processing chain. The waveform processing starts by directly converting baseband I and Q data to an intermediate frequency of, for example, 750 MHz. The waveform processing then selects one of F1 (e.g., 3.175 MHz) and F2 (e.g., 3.425) and one of F3 (e.g., 16 GHz) and F4 (e.g., 17.4 GHz) to produce a waveform to be transmitted with a final center frequency at one of 18.425 GHz, 18.675 GHz, 19.825 GHz, and 20.075 GHz. The scheduler 202 monitors the propagation of data through the waveform processing chain and determines when certain frame signals should be power gated. To that end, the scheduler 202 provides a power gating signal on the control output 216 that is active when power gating is to occur.

The TWTA 210 amplifies the waveform to be transmitted, while the switch 110 determines along which feed path 112–114 (or additional feed paths) the amplified waveform will propagate. For this reason, the switch 110 includes the feed path selection input 222 responsive to information on the control output 216. Because the feed paths 112–114 are generally (though not necessarily) associated with feed horns that produce spot beams in geographically distinct terrestrial cells, the feed path selection input acts to determine the hop location of downlink frames. Thus downlink manifests itself as a beam spot that, typically, provides bandwidth for multiple terrestrial cells by hopping between them. The hop locations below are designated Even or Odd, but are not restricted to even or odd frames. Instead Even and Odd generally designate mutually exclusive time periods.

Figure 3:
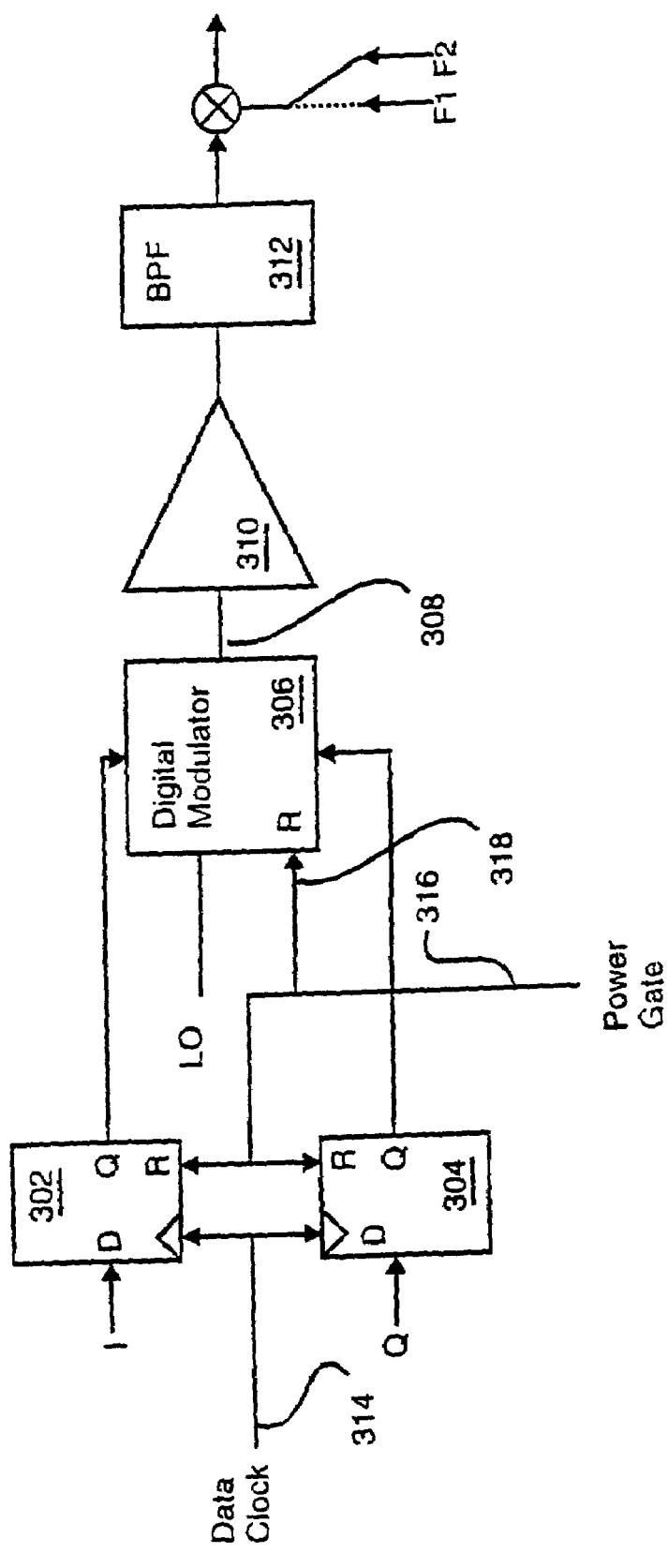
FIG. 3 shows a modulator implementation that supports power gating.

Turning next to FIG. 3, that figure shows an implementation of the modulator 206 that supports power gating. Inphase data is supplied to the Inphase gate 302 while Quadrature data is supplied to the Quadrature gate 304. As illustrated, the Inphase and Quadrature gates 302, 304 are D flip flops with reset inputs. The Inphase and Quadrature gates 302, 304 feed a digital modulator core 306 that produces a modulated waveform on a modulator output 308. A local oscillator (LO) signal (preferably 750 MHz) provides an intermediate frequency carrier signal. The amplifier 310 boosts the modulated waveform, after which it is filtered by the bandpass filter 312. The bandpass filter 312 preferably has a passband centered at 750 MHz, for example, from 625 to 875 MHz.

A data clock 314 that preferably runs at 196.7 MHz drives the Inphase and Quadrature gates 304, 304. Note that a power gate input 316 connects to the Inphase and Quadrature gates 302, 304, as well as to the gating control input 318 of the digital modulator core 306. When an active power gating signal is present on the power gate input 316, the Inphase and Quadrature gates 302, 304 have their outputs held in a known state (e.g., both 0). Furthermore, the digital modulator core 306 outputs a signal with frequency content outside of the passband of the bandpass filter 312.

For example, the digital modulator core 306 may output a DC signal in response to the active power gating signal. As a result, the bandpass filter eliminates the DC signal. A power gated signal results.

Returning to FIG. 2, the upconverter 208 (e.g., a 20 GHz mixer) ordinarily outputs a fully upconverted signal for amplification and transmission. However, the absence of energy in the power gated signal causes the upconverter to produce substantially no signal at its output during power gating. As a result, the TWTA 210 does not expend amplification energy, and substantially no downlink energy is present in the downlink beam while the power gating signal is active. In other words, the DC power consumption of the TWTA 210 is reduced by substantially eliminating radiated power.

Figure 4:
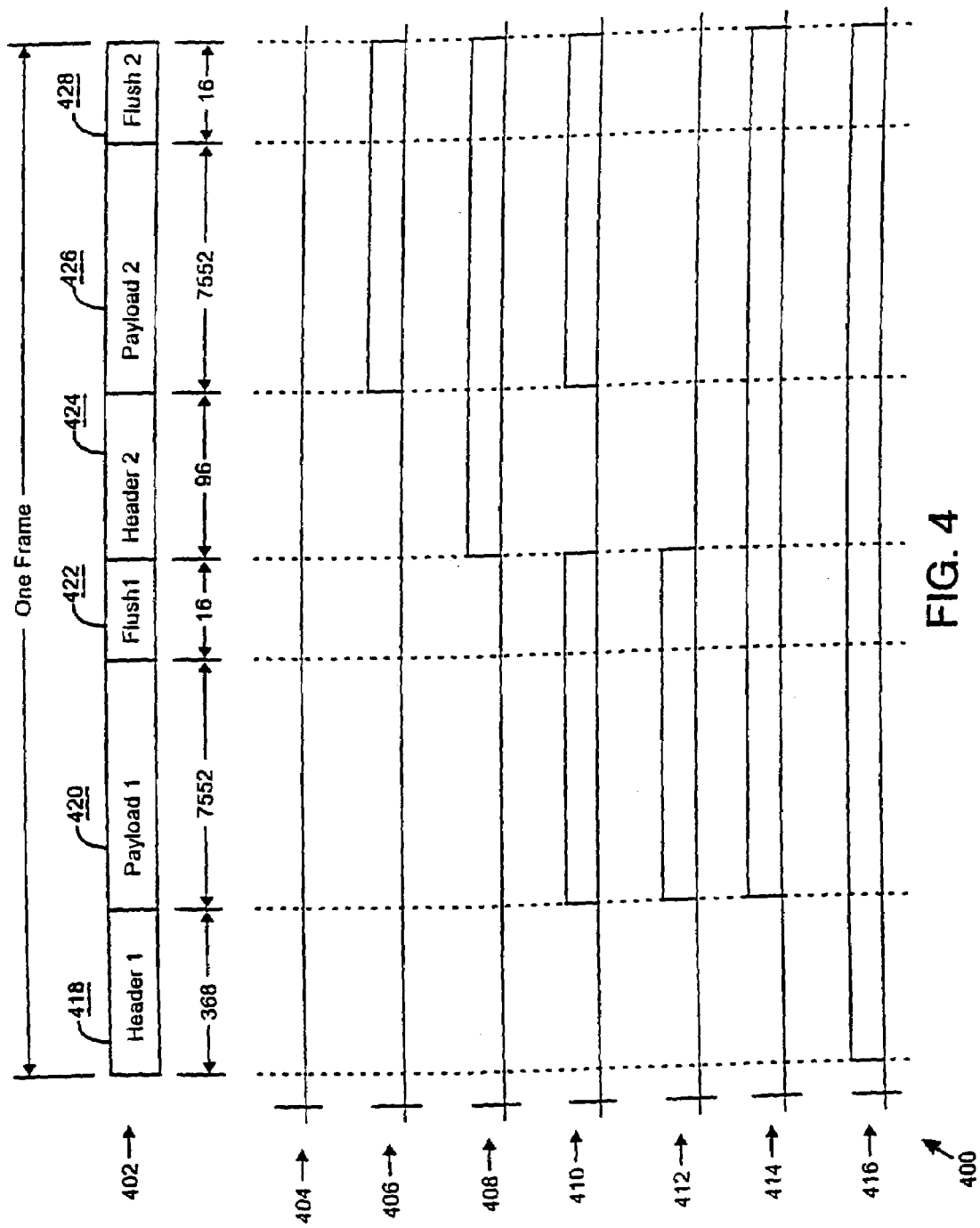
FIG. 4 shows a multiple payload frame signal with exemplary power gating control signals.

Turning next to FIG. 4, that figure presents a timing diagram 400 that illustrates a multiple payload frame signal 402 and power gating signals 404, 406, 408, 410, 412, 414, 416 (assumed active when high). As an example, the frame signal 402 may include a 368 symbol first header signal 418, a 7552 symbol first payload signal 420, a first 16 symbol flush signal 422, a 96 symbol second header signal 424, a 7552 symbol second payload signal 426, and a second 16 symbol flush signal 428. In general, however, the frame signal 402 may include N headers and N payloads independently subject to power gating.

The power gating signal 404 never goes active during the frame signal 402. Thus, none of the frame signals 418–428 are power gated. As a result, both first and second header signals 418, 424 and both first and second payload signals 420, 426 are delivered to the ground. In contrast note that the power gating signal 416 is active across the entire frame signal 402. Thus, substantially no energy is provided in the downlink beam over the time during which the frame signal 402 would be transmitted.

On the other hand, the power gating signal 406 goes active during the second payload signal 426 and the second flush signal 428. Thus, the frame signal 402 continues to bear important overhead information in the first and second header signals 418, 424. The overhead information may include, for example, synchronization bits, beam hopping location identifiers, frame coding identifiers, frame counts, and the like.

The overhead information may further include power gating bit patterns that indicate to a ground receiver which frame signals are power gated. As an example, the first header signal 418 or second header signal 424 may include a frame type field that carries repetitions of the bit pattern 10100101 to indicate power gating of the first payload signal 420 or second payload signal 426, or repetitions of the bit pattern 11110000 to indicate power gating of the entire frame signal 402. In particular, bit patterns may be assigned to identify any combination of header, payload, and flush signal power gating. Note also that a ground receiver may deactivate its own receivers in response to the bit patterns to save power during power gated sections of the frame signal.

Still with reference to FIG. 4, the power gating signal 410 results in power gating of the first and second payload and flush signals 420, 422, 426, 428. Similarly, the power gating signal 412 results in power gating of the first payload signal 420 and the first flush signal 422.

Because the multiple payload frame signal 402 includes multiple headers, each preferably bearing synchronization information, additional power gating options are available. Thus, for example, the power gating signal 408 power gates the second header signal 424, second payload signal 426, and the second flush symbols 428. Synchronization is nevertheless provided by the first header signal 418. Similarly, the power gating signal 414 power gates all the frame signals except for the first header signal 418.

The scheduler 202 may include logic to assert the power gating signal under many scenarios. For example, when the satellite moves into eclipse and less power is available, the scheduler 202 may power gate every other complete frame, every other payload, or any combination of frame signals to achieve a desired power reduction. As another example, the scheduler 202 may activate the power gating signal in response to a statistical multiplexing estimate of downlink beam utilization. As an example, if the downlink beam is estimated to be 90% utilized during a certain time period, then the scheduler 202 may power gate up to 10% of the frames or payloads. Such estimates may be uplinked to the satellite or generated onboard.

As another example, the scheduler 202 may determine when to activate power gating based on the current terrestrial cell hop location of the downlink beam. Thus, scheduler 202 may power gate the second payload signal 426 if the bandwidth requirements of the current terrestrial cell are met by the first payload signal 420 alone. As yet another example, the scheduler 202 may power gate based on data queues present in the router 204. For example, a data queue from which ATM data cells are extracted to fill the second payload signal 426 may consistently have too few cells to completely fill the second payload signal 426. In response, the scheduler 202 may power gate the second payload signal 426 periodically in order to maintain the data queue approximately at preselected occupancy level, on average. In addition, an entire frame may be power gated when too few cells exist to fill one or more payloads in the frame. Alternatively, only a selected one of the payloads may be power gated in such a case in order to maintain a selected minimum throughput.

Figure 5:
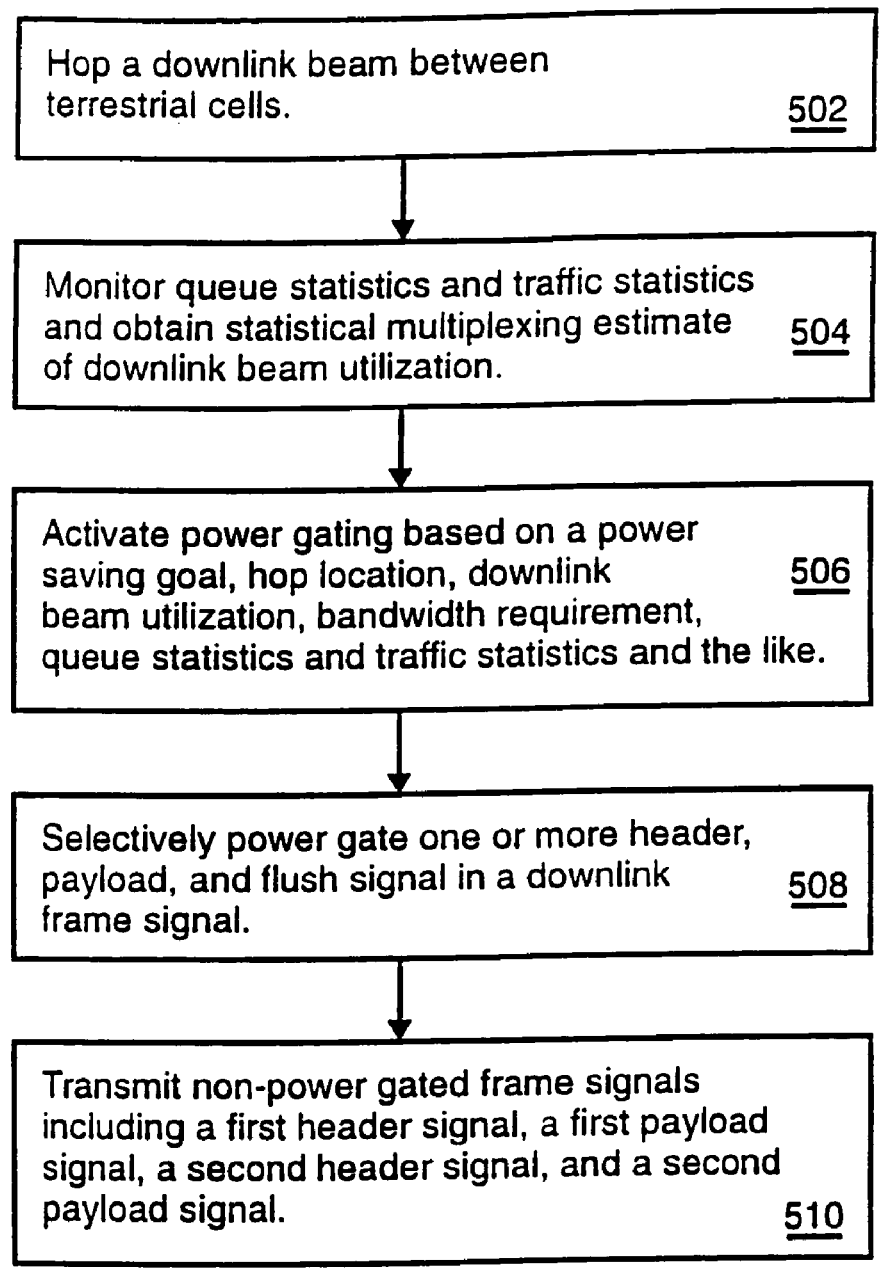
FIG. 5 illustrates operational steps that occur before and after power gating a beam hopping multiple payload frame signal.

Turning next to FIG. 5, that figure shows a flow diagram 500 of the operational steps that occur before and after power gating. The operational steps include hopping 502 a downlink beam between at least two terrestrial cells. At step 504, queue statistics and traffic statistics are monitored and statistical multiplexing estimates of downlink utilization are obtained. At step 506, power gating is activated based on, as examples, beam hop locations, power saving goals, queue statistics and traffic statistics, and the like.

Continuing at step 508, one or more header signals, payload signals, and flush signals may be power gated. Thus, at step 510, a frame signal is transmitted in which at least one header signal, payload signal, or flush signal may have substantially no energy in the downlink beam.

Thus, the present invention provides selective power gating of frame signals in a beam hopped multiple payload downlink frame. The power gating may be responsive to many diverse criteria including power saving goals, queue statistics and traffic statistics, statistical multiplexing estimates, and terrestrial beam hop location. More efficient use of the downlink, satellite power, and satellite processing resources result.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A power gating module for power gating a downlink transmitter that is configured to transmit a downlink beam frame signal, the power gating module comprising:
   a power amplifier for amplifying transmission frame signal, including at least a first header signal, a first payload signal a second header signal and a second payload signal; and
   a power gating circuit coupled to the power amplifier the power gating circuit including a power gate input and responsive to a power gating signal to remove power from the downlink transmitter during transmission of at least one of the first header signal and first payload signal in combination and the second header signal and second payload signal in combination before amplification by the power amplifier;
   wherein the power gating circuit comprises a digital modulator with a gating control input connected to the power gate input and a bandpass filter with a predetermined passband coupled to a modulator output of the digital modulator.

2. The power gating module of claim 1, wherein the digital modulator outputs a modulated signal with frequency content outside the passband in response to the power gating signal.

3. The power gating module of claim 2 wherein the frequency content is substantially DC frequency content.

4. The power gating module of claim 1, wherein the digital modulator is a QPSK modulator and further comprising an Inphase gate and a Quadrature gate coupled to the digital modulator.

5. The power gating module of claim 4 wherein the Inphase gate and the Quadrature gate are held in a known output state in response to the power gating signal.

6. A power gating module for power gating a downlink transmitter that is configured to transmit a downlink beam frame signal, the power gating module comprising:
   a power amplifier for amplifying transmission frame signal including at least a first header signal, a first payload signal second header signal and a second payload signal;

a power gating circuit coupled to the power amplifier, the power gating circuit including a power gate input and responsive to a power gating signal to remove power from the downlink transmitter during transmission of at least one the first header signal and first payload signal in combination, and the second header signal and second payload signal in combination before amplification by the power amplifier;

a switch coupled to the power amplifier, the switch including a feed path selection input;

a first feed path coupled to the switch and characterized by a first hop location; and a second feed path coupled to the switch and characterized by a second hop location.

7. The power gating module of claim 6, wherein the switch is a ferrite switch.

8. The power gating module of claim 6, wherein the power gating signal is active based in part on the feed path selection of the first hop location or the second hop location.

* * * * *